United States Patent [19]

Rast

[11] 4,336,086

[45] Jun. 22, 1982

[54] METHOD OF LINING A FURNACE WITH ROLL-TYPE INSULATION

[76] Inventor: James P. Rast, 9510 Herring Hill, Millington, Tenn. 38053

[21] Appl. No.: 188,346

[22] Filed: Sep. 18, 1980

Related U.S. Application Data

[63] Continuation-in-part of Ser. No. 827,316, Aug. 24, 1977, abandoned.

[51] Int. Cl.[3] ........................ B32B 31/10; C21B 7/06; F23M 5/00; F27D 1/16

[52] U.S. Cl. .................................. 156/71; 29/402.14; 52/486; 52/506; 52/535; 52/540; 52/745; 52/746; 52/748; 52/765; 110/336; 156/91; 156/94; 156/204; 156/252; 264/30; 266/281; 266/283; 428/57; 428/58; 428/60; 428/78; 428/181; 428/223; 432/248

[58] Field of Search ................................. 29/402–414; 52/273, 283, 285, 366, 376, 478, 486, 506, 535, 540, 700, 745, 746, 748, 764, 765; 110/336; 156/71, 91, 92, 94, 204, 252; 264/30; 266/281, 282, 283; 428/37, 57, 58, 60, 78, 101, 181, 223; 432/248

[56] References Cited

U.S. PATENT DOCUMENTS

| | | | |
|---|---|---|---|
| 3,819,468 | 6/1974 | Sauder et al. | 156/92 X |
| 3,854,262 | 12/1974 | Brady | 110/336 X |
| 3,892,396 | 7/1975 | Monaghan | 110/336 X |
| 3,993,237 | 11/1976 | Sauder et al. | 264/30 X |
| 4,011,394 | 3/1977 | Shelley | 110/336 X |
| 4,086,737 | 5/1978 | Byrd | 156/94 X |
| 4,123,886 | 11/1978 | Byrd | 156/94 X |
| 4,222,337 | 9/1980 | Christiansen | 110/336 |
| 4,246,852 | 1/1981 | Werych | 110/336 |

*Primary Examiner*—Robert A. Dawson
*Attorney, Agent, or Firm*—Walker & McKenzie

[57] ABSTRACT

A method of lining an interior surface of a furnace with roll-type insulation by attaching a plurality of hooks onto the interior surface to be lined, folding back portions of the roll-type insulation on themselves to create folds in the roll-type insulation, and pressing the folds onto the hooks to thereby attach the roll-type insulation to the interior surface. Each of the plurality of hooks includes a hook member for passage through portions of the roll-type insulation. Each hook member is fixedly attached to the interior surface of the furnace either by being welded directly thereto when the interior surface of the furnace is metal or by being fixedly attached to a plate member which is in turn bolted, riveted, or otherwise fixedly attached to the interior surface of the furnace. The hook member includes a leg portion having a pointed first end for passage through the roll-type insulation and having a second end. The hook member also includes a bridge portion having a first end fixedly attached to the plate member and having a second end substantially remote from the first end thereof and fixedly attached to the second end of the leg portion.

9 Claims, 16 Drawing Figures

METHOD OF LINING A FURNACE WITH ROLL-TYPE INSULATION

CROSS-REFERENCE TO RELATED APPLICATION

This is a continuation-in-part of my application, Ser. No. 827,316, filed Aug. 24, 1977, entitled "Method of Attaching Refractory Fibers", now abandoned.

BACKGROUND OF THE INVENTION

1. Field of the Invention

This invention relates to methods of and means for lining of all types of interior surfaces of furnaces with roll-type insulation.

2. Description of the Prior Art

Heretofore, various methods and means have been used for lining the interior surfaces of furnaces with roll-type insulation. For example, roll-type insulation has been applied to the interior surfaces of furnaces in substantially flat multiple layers and attached thereto by way of metal bolts or studs extending through the multiple layers of the insulation. However, this method is disadvantageous in that the bolts or studs used to fasten the insulation to the furnace are exposed to the high temperature of the furnace and therefore, deteriorate rather rapidly. Additionally, this method is expensive, since more than one layer of insulation is required to provide the desired insulation.

A method which overcomes certain of the problems of the above described method is to attach strips or layers of insulation to metal plates to form substantially square or rectangular blocks and bolting, welding, or otherwise attaching these blocks to the surface to be lined in a side-by-side, abutting manner with the bolt or weld covered by the insulation to thereby overcome the problem of the deterioration of the attachment means due to exposure to the high temperature of the furnace. However, this method is disadvantageous for a number of reasons. For example, the ceramic fiber insulation used to line the interior of furnaces tends to shrink when submitted to temperatures of above 2200° thereby causing cracks to form in the abutting edges of the blocks of insulation which, of course, results in a heat loss therethrough. Also, this method is expensive since, for example, it requires the separate steps of first constructing the blocks from rolls of insulation and then attaching the blocks of insulation to the interior surface of a furnace.

Another method is to attach a single layer of insulation to metal backing or the like in a sinuous manner so as to form a substantially square or rectangular block of insulation and to bolt or otherwise attach a plurality of these blocks of insulation to the surface to be lined in a side-by-side abutting manner, with the bolt or the like covered by the insulation to thereby overcome the problem of deterioration of the attachment means due to exposure to the high temperatures of the furnace. However, this method is also disadvantageous for a number of reasons. For example, as heretofore discussed, such insulation tends to shrink when submitted to temperatures of above 2200°, thereby causing cracks to form at certain of the abutting edges of the blocks of insulation which, of course, since, for example, it requires the separate steps of first constructing the insulation blocks from rolls of insulation and then attaching these blocks to the interior surface of a furnace.

SUMMARY OF THE INVENTION

The present invention is directed toward overcoming the problems and disadvantages of prior methods of and means for lining a furnace with roll-type insulation. The concept of the present invention is to line an interior surface of a furnace with roll-type insulation by fixedly attaching a plurality of hook means to the interior surface of the furnace; folding back portions of the roll-type insulation on themselves to create folds; and pressing the folds of the roll-type insulation onto the hook means to fixedly attach the roll-type insulation to the hook means and to the interior surface of the furnace so as to line the interior surface of the furnace with the folds of the roll-type insulation and lapping adjacent folds.

Each of the plurality of hook means includes a hook member for passage through portions of the roll-type insulation. Each hook member is fixedly attached to the interior surface of the furnace either by being directly attached thereto or by being fixedly attached to a plate member which is in turn fixedly attached to the interior surface of the furnace. The hook member includes a leg portion having a substantially pointed first end for passes through the roll-type insulation and a second end. The hook member also includes a bridge portion, having a first end fixedly attached to the plate member and having a second end located substantially remote from the plate member and fixedly attached to the second end of the leg portion.

DESCRIPTION OF THE PREFERRED EMBODIMENT

Figure 1:
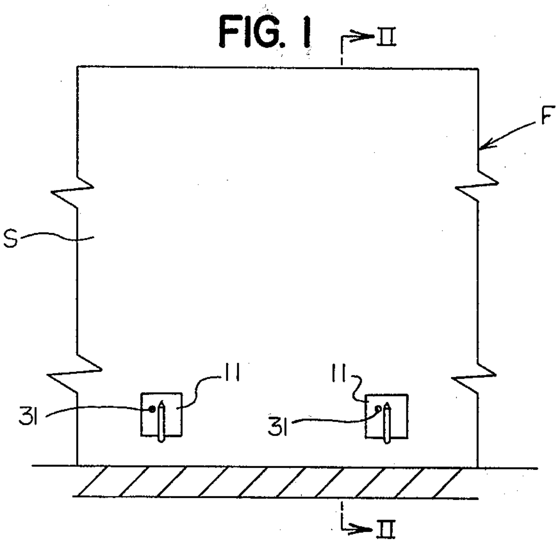
FIG. 1 is a partially sectional elevational view of a portion of the interior surface of a furnace showing hook means being attached thereto in accordance with the method of the present invention.
Figure 2:
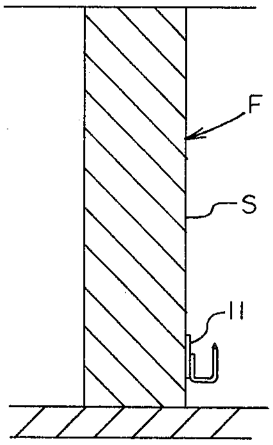
FIG. 2 is a sectional side elevational view substantially as taken on line II—II of FIG. 1.
Figure 3:
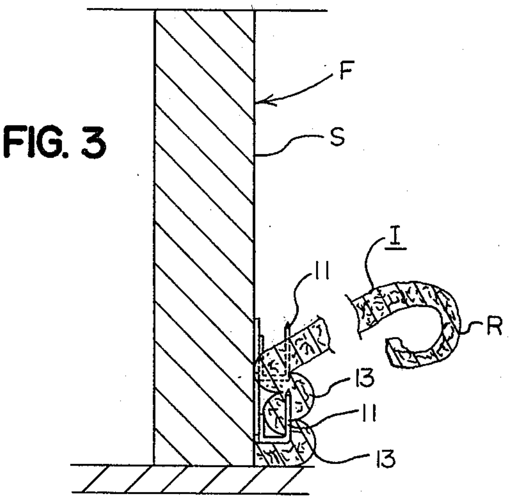
FIG. 3 is a sectional side elevational view similar to FIG. 2 but showing portions of a roll of insulation being folded back on themselves and being attached to the hook means in accordance with the method of the present invention.
Figure 4:
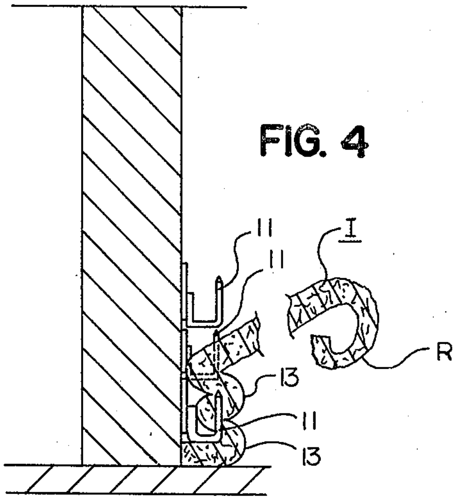
FIG. 4 is a sectional side elevational view similar to FIG. 3 but showing additional hook means being attached to the interior surface of the furnace in accordance with the method of the present invention.
Figure 5:
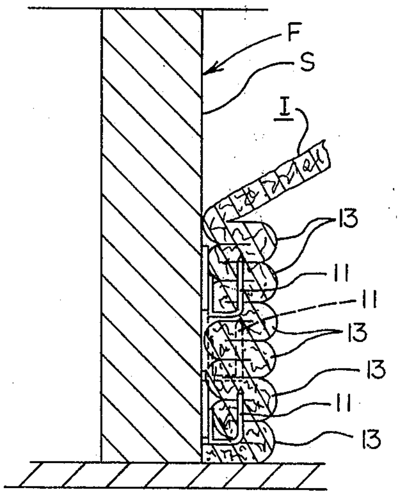
FIG. 5 is a sectional side elevational view similar to FIG. 4 but showing additional portions of the roll of insulation being folded back on themselves and being attached to the hook means in accordance with the method of the present invention.
Figure 10:
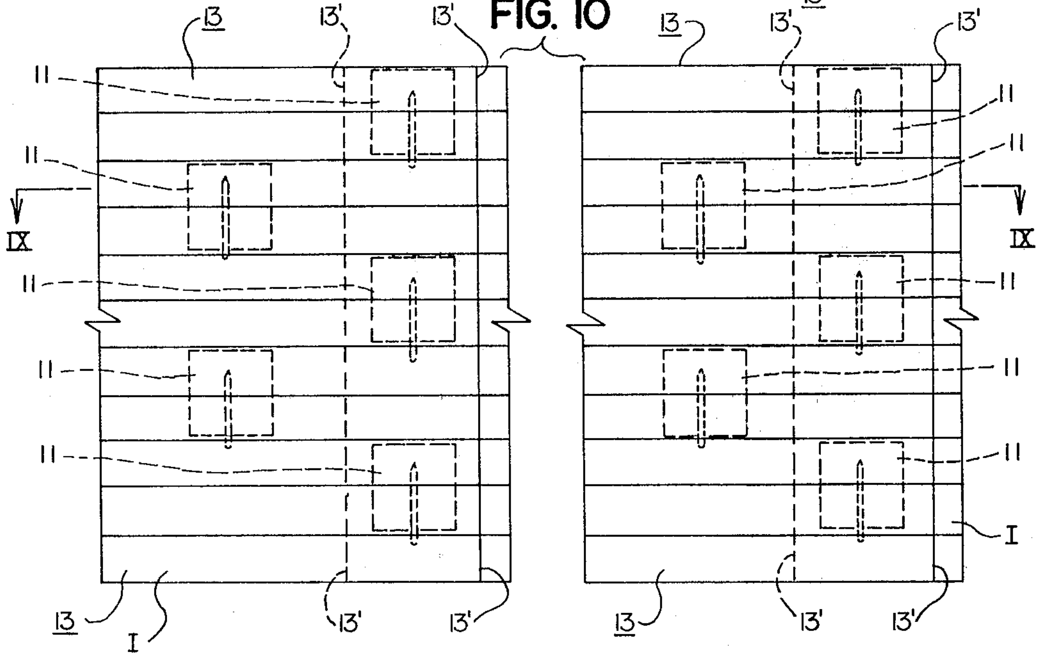
FIG. 10 is an elevational view of a portion of an interior wall of a furnace showing insulation applied thereto in accordance with the method of the present invention.

The method of lining an interior surface S of a furnace F of the present invention, includes, in general, the steps of fixedly attaching a plurality of hook means 11 to the interior surface S of the furnace F to be lined, folding back portions of the roll R of roll-type insulation I (preferably a ceramic fiber blanket-type insulation well known to those skilled in the art) on themselves to create folds 13 (preferably the folds 13 are substantially transverse to the longitudinal length of the insulation I, but substantially parallel with the axis of the roll R as clearly shown in FIGS. 3–5); and pressing the folds 13 onto the hook means 11 to fixedly attach the roll-type insulation I to the hook means 11 and to the interior surface S of the furnace F so as to line the interior surface S of the furnace F with the transverse folds 13 of the roll-type insulation I (see, in general, FIGS. 1–5). It should be noted that the hook means 11 may be fixedly attached to the interior surface S in any of a number of ways such as bolting, riveting, welding or the like. Also, the hook means 11 are preferably attached to the interior surface S of the furnace F so that each fold 13 will be attached to the interior surface S by a hook means 11. The hook means 11 are preferably staggered as shown in FIG. 10 since the accumulated build-up of the insulation I would in many cases make it difficult to apply the folds 13 to hook means 11 if the hook means 11 were positioned directly in line with one another.

Figure 7:
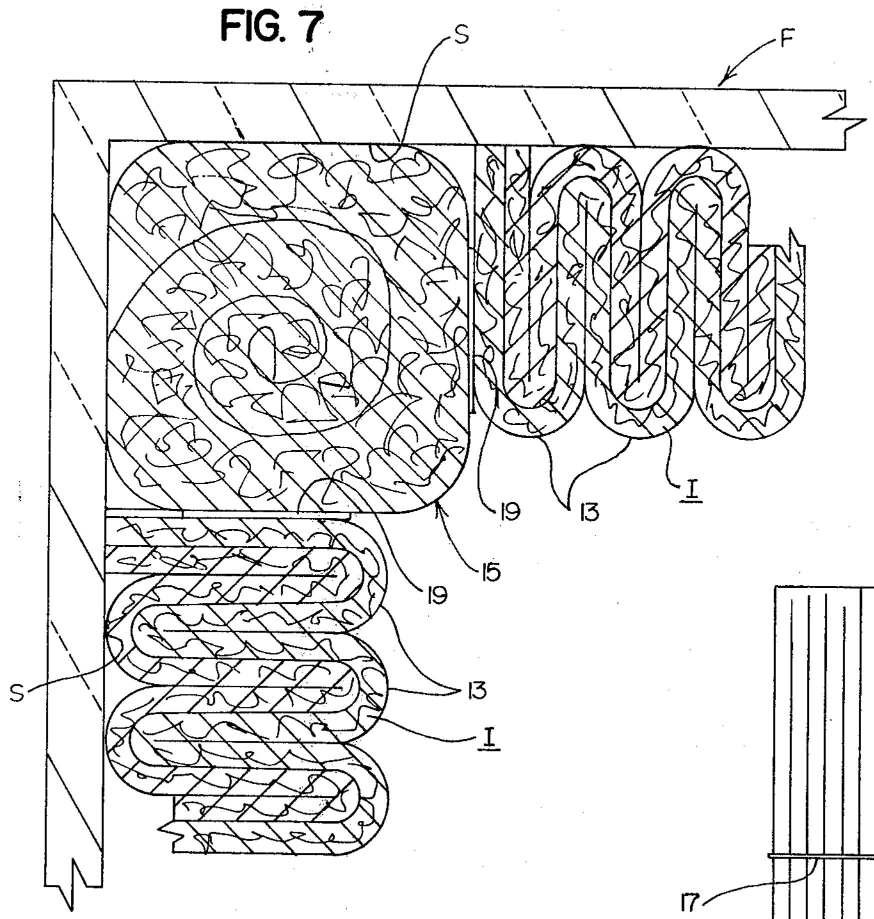
FIG. 7 is a sectional view showing a roll of insulation applied to a substantially 90° bend formed by the interior surface of the furnace in accordance with the method of the present invention.
Figure 8:
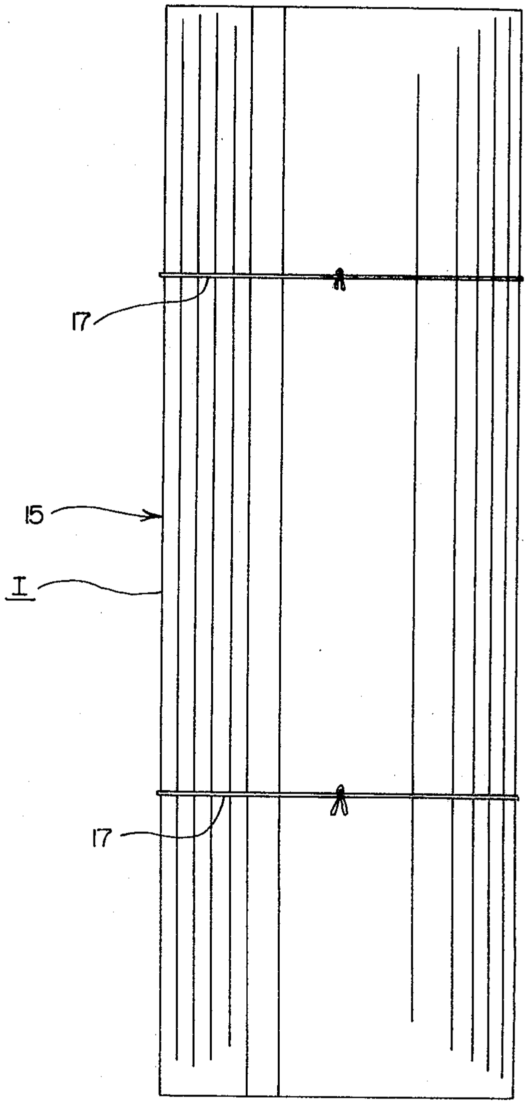
FIG. 8 is an elevational view of the roll of insulation of FIG. 7.

The method of the present invention may include the steps of rolling a portion of the roll-type insulation I onto a substantially elongated roll 15; tying at least one length of string 17 about the elongated roll 15; and then attaching the elongated roll 15 to any substantially 90° bend formed by the interior surface S of the furnace F. Additionally, the method of the present invention may include the steps of abutting the folds 13 of the roll-type insulation I and the elongated roll 15 and attaching the abutting edges of the elongated roll 15 and the transverse folds 13 of the roll-type insulation I together (see, in general, FIGS. 7 and 8). For example, a portion of glue 19 may be applied to the abutting edges of the elongated roll 15 and the folds 13 to attach the abutting edges thereof together (see FIG. 7). It should be noted that once the furnace F is heated to its normal temperature, the strings 17 will catch fire and burn, thereby allowing the roll 13 to spring against the folds 13 making a better seal therebetween.

Also, the method of the present invention may include the step of overlapping the edges of two adjacent strips of the roll-type insulation I to prevent cracks or the like from forming along the edges of the adjacent strips of roll-type insulation even if the insulation I shrinks when submitted to high temperature or the like. Thus, even if the edges of two adjacent strips of insulation I shrink or otherwise move away from one another the overlapped edges will still be overlapping one another as will not be apparent to those skilled in the art. There are various specific methods of overlapping the edges of two adjacent strips of insulation I.

Figure 6:
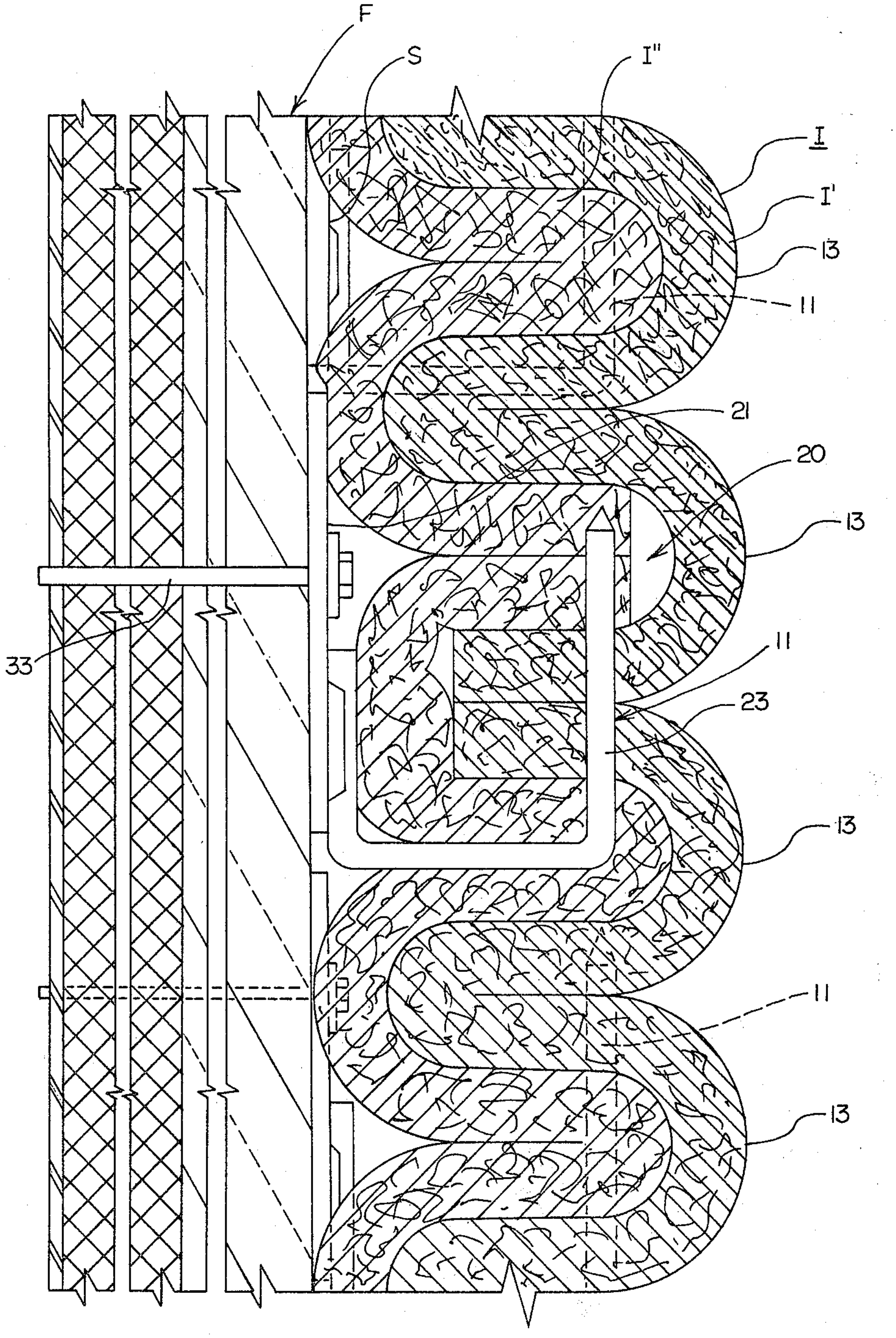
FIG. 6 is an enlarged sectional side elevational view similar to a portion to FIG. 5 but showing the furnace wall, hook means and insulation in more detail.

One method of overlapping the edges of two adjacent strips of insulation I is shown in FIG. 6. In this method, each strip of insulation I consists of a first layer I' of one type or grade of insulation and a second layer I" of a second layer or grade of insulation. The overlapped portion can then be easily formed merely by offsetting the ends of the two layers I', I" one to the other as clearly shown in FIG. 6 to form a splice 20. Forming the insulation I out of two layers also provides greater control over the amount of insulation provided.

Figure 9:
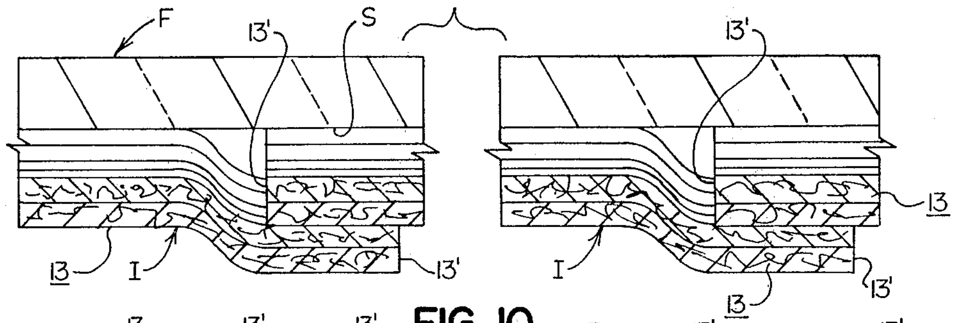
FIG. 9 is a sectional view as taken on line IX—IX of FIG. 10.

Another method of overlapping the edges of two adjacent strips of insulation I is shown in FIGS. 9 and 10. In this method, the edge of one strip of insulation I is merely placed on top of the edge of an adjacent strip of insulation I so that a portion of one strip of insulation I will overlay a portion of the adjacent strip of insulation.

Figure 14:
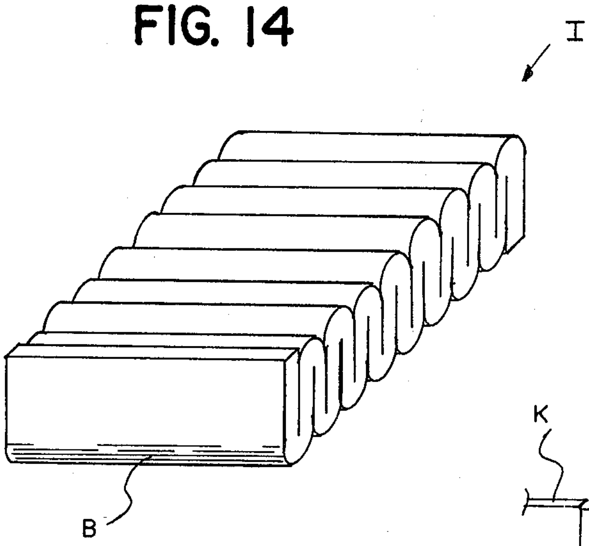
FIG. 14 is a perspective view of a block-like member folded from a roll of insulation.
Figure 15:
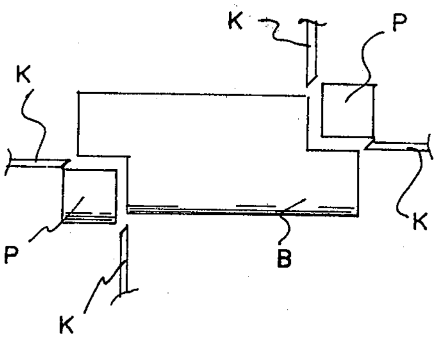
FIG. 15 is a somewhat diagrammatic bottom plan view of the block-like member of FIG. 14 showing knives being used to cut sections from each edge thereof.
Figure 16:
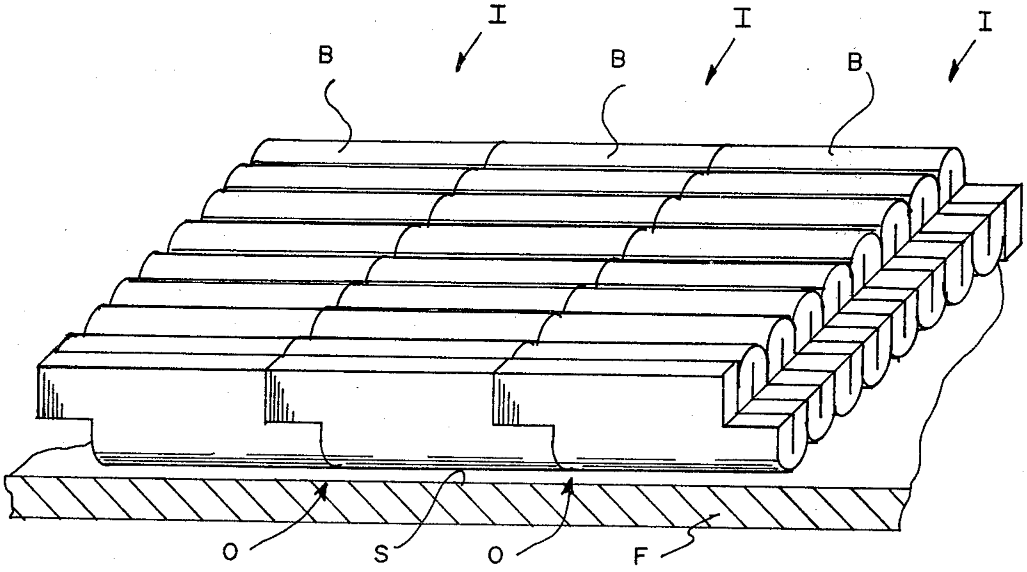
FIG. 16 is a somewhat diagrammatic perspective view of a plurality of the block-like members of FIGS. 14 and 15 attached to the interior surface of a furnace and associated with one another to form ship-lap type overlaps.

A third method of overlapping the edges of two adjacent strips of insulation I is shown in FIGS. 14, 15 and 16. In this method, a section is cut from the edges of each strip of insulation I to form a ship-lap type overlap O when two adjacent strips of insulation I are associated as shown in FIG. 16. The specific manner of cutting the section of material from each strip of insulation I may vary. Preferably, portions of each strip or length of insulation I is first folded back on itself to create at least a portion of a folded block-like member B as shown in FIG. 14. Next, a knife K or other cutting instrument is passed along the edges of the block-like member B as shown diagrammatically in FIG. 15 thereby cutting a portion P from each edge of the block-like member B to form a ship-lap like shape on each edge of the block-like member B. The block-like members B can then be attached to the interior surface S of the furnace F by way of the hook means 11 or the like and the edges of each adjacent strip of insulation I will coact to form a ship-lap type overlap O as shown in FIG. 16.

Figure 11:
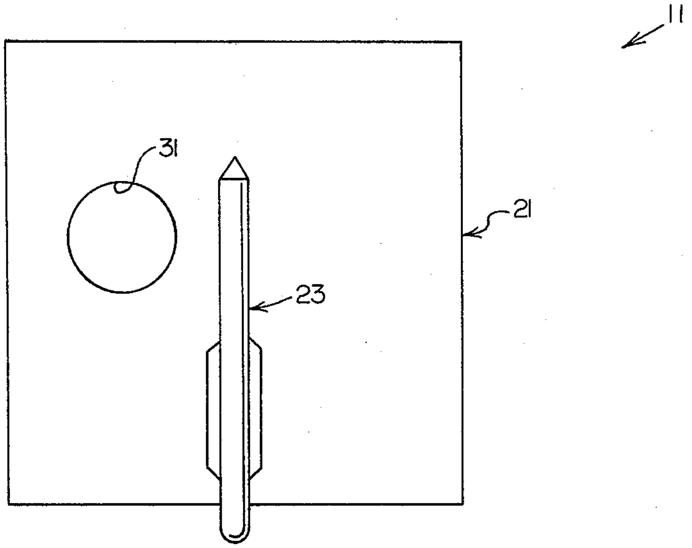
FIG. 11 is a front elevational view of a hook means of the present invention.
Figure 12:
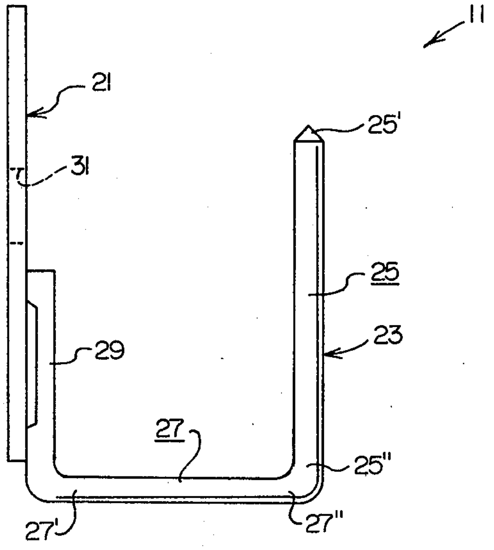
FIG. 12 is a side elevational view of FIG. 11.
Figure 13:
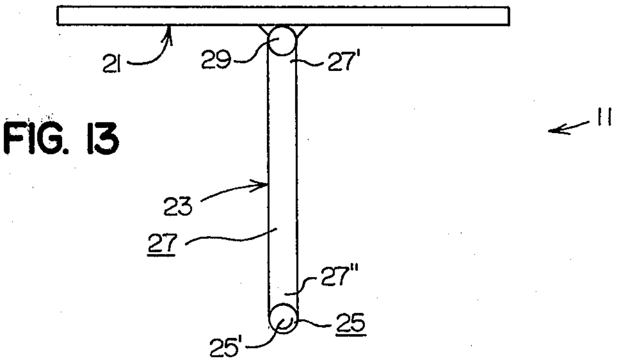
FIG. 13 is a top plan view of FIGS. 11 and 12.

Each of the hook means 11 of the present invention includes a hook member 23 for passage through portions of the roll-type insulation I. Each hook member 23 is fixedly attached to the interior surface S of a furnace F either by being welded directly thereto when the interior surface S of the furnace is metal or by being fixedly attached to a plate member 21 which is in turn fixedly attached to the interior surface S of the furnace F thereby attaching the roll-type insulation I to the interior surface S of the furnace (see, in general, FIGS. 11–13). The hook member 23 includes a leg portion 25 having a first end 25' and a second end 25". The first end 25' of the leg portion 25 is substantially pointed for easy passage through the roll-type insulation I. The hook member 23 also includes a bridge portion 27 having a first end 27' and a second end 27". The first end 27' of the bridge portion 27 is fixedly attached to the plate member 21 as by welding or the like. The second end 27" of the bridge portion 27 is located substantially remote from the plate member 21 and is fixedly attached to the second end 25" of the leg portion 25. The hook member 23 may be substantially U-shaped and may include a leg portion 29 fixedly attached to the first end 27′ of the bridge portion and to the plate member 21 substantially parallel with the leg portion 25 (see, in general, FIGS. 12 and 13). The bridge portion 27 of the hook member 23 may be curved or formed on a radius rather than being substantially straight as shown in the drawings. The plate member 21 may have an aperture 31 therein (see, in general, FIG. 11) for allowing a bolt 33 or the like (see FIG. 6) to pass therethrough for attaching the plate member 21 to the interior surface S of the furnace F in any manner apparent to those skilled in the art.

Although the invention has been described and illustrated with respect to preferred embodiments thereof, it is not to be so limited since changes and modifications may be made therein which fall within the full intended scope of the invention.

I claim:

1. A method of lining an interior surface of a furnace with roll-type insulation, said method comprising:
- (a) fixedly attaching a plurality of hook means to said interior surface of said furnace;
- (b) folding back portions of said roll-type insulation on themselves to create folds;
- (c) pressing said folds of said roll-type insulation onto said hook means to fixedly attach said roll-type insulation to said hook means and to said interior surface of said furnace so as to line said interior surface of said furnace with said folds of said roll-type insulation; and
- (d) overlapping the side edges of adjacent folds of said roll-type insulation.

2. The method of claim 1 in which is included the steps of:
- (a) rolling a portion of said roll-type insulation into an elongated spiral-like roll; and
- (b) attaching said elongated roll to any substantially 90° bend formed by said interior surface of said furnace so as to line said substantially 90° bend of said interior surface of said furnace with said roll-type insulation.

3. The method of claim 2 in which is included the step of tying at least one length of string about said elongated roll prior to its being attached to said interior surface of said furnace.

4. The method of claim 3 in which is included the steps of:
- (a) abutting said folds of said roll-type insulation and said elongated roll; and
- (b) attaching the abutting edges of said elongated roll and said folds of said roll-type insulation together.

5. A method of lining an interior surface of a furnace with roll-type ceramic fiber insulation, said method comprising:
- (a) fixedly attaching a plurality of hook means to said interior surface of said furnace;
- (b) folding back portions of said roll-type ceramic fiber insulation on themselves to create transverse folds in said roll-type ceramic fiber insulation;
- (c) pressing said transverse folds onto said hook means to fixedly attach said roll-type ceramic fiber insulation to said hook means and to said interior surface of said furnace;
- (d) overlapping the side edges of adjacent transverse folds;
- (e) rolling portions of said roll-type ceramic fiber insulation into elongated rolls;
- (f) tying lengths of string about said elongated rolls;
- (g) gluing said elongated rolls to every substantially 90° bend formed by said interior surface of said furnace;
- (h) abutting said transverse folds of said roll-type ceramic insulation and said elongated rolls; and
- (i) gluing the abutting edges of said elongated rolls and said transverse folds together.

6. A method of lining an interior surface of a furnace with a plurality of elongated lengths of insulation, said method comprising:
- (a) fixedly attaching a plurality of hook means to said interior surface of said furnace;
- (b) folding back portions of a first elongated length of insulation on themselves to create folds;
- (c) pressing said folds of said first elongated length of insulation onto a plurality of said hook means to fixedly attach said first elongated length of insulation to said hook means and to said interior surface of said furnace so as to line a first portion of said interior surface of said furnace with said folds of insulation;
- (d) folding back portions of a second elongated length of insulation on themselves to create folds; and
- (e) pressing said folds of said second elongated length of insulation onto a plurality of said hook means with one side edge of said folds of said second elongated length of insulation overlapping the adjacent side edge of said folds of said first elongated length of insulation to fixedly attach said second elongated length of insulation to said hook means and to said interior surface of said furnace so as to line a second portion of said interior surface of said furnace with said folds of insulation.

7. A method of lining an interior surface of a furnace with a plurality of elongated lengths of insulation, said method comprising:
- (a) fixedly attaching a plurality of hook means to said interior surface of said furnace;
- (b) folding back portions of a first elongated length of insulation on themselves to create folds;
- (c) pressing said folds of said first elongated length of insulation onto a plurality of said hook means to fixedly attach said first elongated length of insulation to said hook means and to said interior surface of said furnace so as to line a first portion of said interior surface of said furnace with said folds of insulation;
- (d) folding back portions of a second elongated length of insulation on themselves to create folds; and
- (e) pressing said folds of said second elongated length of insulation onto a plurality of said hook means with one top edge of said second elongated length of insulation overlapping the adjacent bottom edge of said first elongated length of insulation to fixedly attach said second elongated length of insulation to said hook means and to said interior surface of said furnace so as to line a second portion of said interior surface of said furnace with said folds of insulation.

8. A method of lining an interior surface of a furnace with roll-type insulation including first and second layers, said method comprising:
- (a) fixedly attaching a plurality of hook means to said interior surface of said furnace;
- (b) folding back portions of said roll-type insulation on themselves to create folds;

(c) offsetting the ends of said first and second layers of said roll-type insulation one to the other; and (d) pressing said folds of said roll-type insulation onto said hook means to fixedly attach said roll-type insulation to said hook means and to said interior surface of said furnace so as to line said interior surface of said furnace with said folds of roll-type insulation.

9. A method of lining an interior surface of a furnace with a plurality of elongated lengths of insulation having first and second layers of different grades, said method comprising:

(a) fixedly attaching a plurality of hook means to said interior surface of said furnace;

(b) folding back portions of a first elongated length of insulation on themselves to create folds;

(c) offsetting the ends of said first and second layers of said first elongated length of insulation one to the other;

(d) pressing said folds of said first elongated length of insulation onto a plurality of said hook means to fixedly attach said first elongated length of insulation to said hook means and to said interior surface of said furnace so as to line a first portion of said interior surface of said furnace with said folds of insulation;

(e) folding back portions of a second elongated length of insulation on themselves to create folds;

(f) pressing said folds of said second elongated length of insulation onto a plurality of said hook means with one side edge of said folds of said second elongated length of insulation overlapping the adjacent side edge of said folds of said first elongated length of insulation to fixedly attach said second elongated length of insulation to said hook means and to said interior surface of said furnace so as to line a second portion of said interior surface of said furnace with said folds of insulation;

(g) folding back portions of a third elongated length of insulation on themselves to create folds;

(h) offsetting the ends of said first and second layers of said third elongated length of insulation one to the other; and (i) pressing said folds of said third elongated length of insulation onto a plurality of said hook means with the offset ends of said first and second layers of said first and third elongated lengths of insulation forming a splice with one another to fixedly attach said second elongated length of insulation to said hook means and to said interior surfaces of said furnace so as to line a third portion of said interior surface of said furnace with said folds of insulation.

* * * * *